United States Patent [19]

Nomura et al.

[11] Patent Number: 5,001,732
[45] Date of Patent: Mar. 19, 1991

[54] TRACK COUNTER FOR OPTICAL DISK

[75] Inventors: Masaru Nomura, Tenri; Hirotsugu Matoba, Sakurai; Toshihisa Deguchi, Nara; Shigeo Terashima, Tenri, all of Japan

[73] Assignee: Sharp Kabushiki Kaisha, Osaka, Japan

[21] Appl. No.: 458,367

[22] Filed: Dec. 28, 1989

[30] Foreign Application Priority Data

Jan. 10, 1989 [JP] Japan ................................. 1-3167

[51] Int. Cl.$^5$ .............................................. G11B 21/10
[52] U.S. Cl. .......................................... 377/3; 377/49; 369/32; 369/44.25; 369/44.26; 360/78.04
[58] Field of Search ...................... 360/78.04, 78.09; 369/32, 44.25, 44.26; 377/3, 49

[56] References Cited

U.S. PATENT DOCUMENTS

| | | | |
|---|---|---|---|
| 4,623,943 | 11/1986 | Osada et al. | 360/78.04 |
| 4,775,967 | 10/1988 | Shimada et al. | 369/44.26 |
| 4,811,316 | 3/1989 | Hosuya | 369/32 |
| 4,845,697 | 7/1989 | Giddings | 369/32 |
| 4,924,483 | 5/1990 | Cho | 377/3 |
| 4,995,989 | 9/1987 | Kimoto | 369/32 |

FOREIGN PATENT DOCUMENTS 58-185043 10/1983 Japan .

Primary Examiner—John S. Heyman

[57] ABSTRACT

The track counter for optical disk in accordance with the present invention, that counts the number of tracks a light beam passes upon when an optical head moves over an optical disk in the radial direction, comprises a passage signal generating circuit for detecting based on a reflected light of the light beam from the optical disk, that the light beam passed upon a track and for releasing a passage signal on that occasion, a counter that counts the passage signals released by the passage signal generating circuit, a count suspending circuit for forecasting that the light beam will pass upon a specific position of a track and for suspending the count by the aforementioned counter of the passage signals during this forecasted period, and a count value compensating circuit for assuming, when the count of the passage signals is suspended by the count suspending circuit, the number of tracks the light beam passed upon during that period, and for adding this assumed number to the count value of the counter. This track counter for optical disk is arranged such that it is able to count accurately the number of tracks the light beam passed upon even when the light beam passed upon the ID sections of a track, or when the passage upon a track cannot be detected because of a scratch on the surface of the disk or the like. Thereby, when the optical head moves and slides, the access speed may be enhanced.

20 Claims, 10 Drawing Sheets

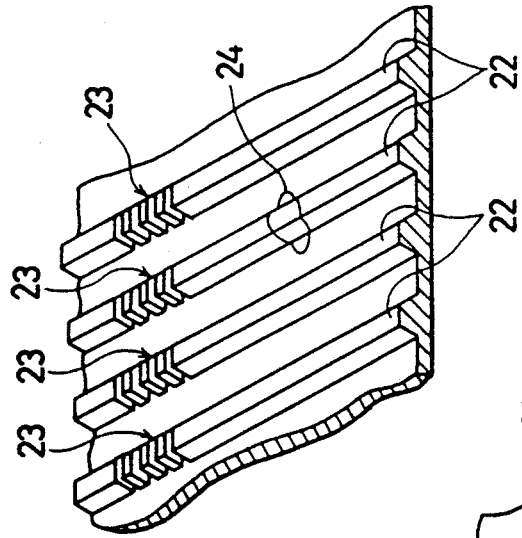
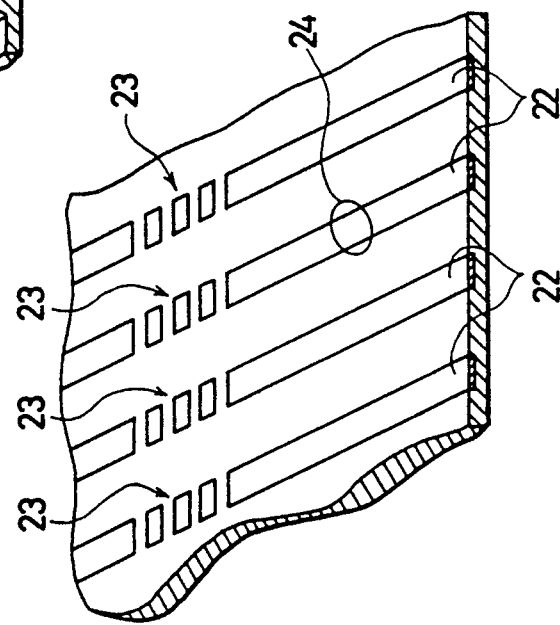
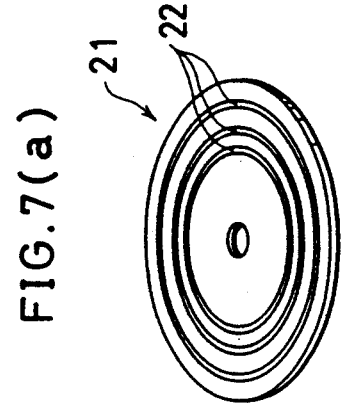

TRACK COUNTER FOR OPTICAL DISK

FIELD OF INVENTION

The present invention relates to a track counter for counting the number of tracks a light beam passes upon, when an optical head is moved in the radial direction of an optical disk.

BACKGROUND OF THE INVENTION

The optical disk is receiving a lot of attention as a recording device capable of recording large quantities of information. However, the recording/reproducing apparatus of the optical disk presents the disadvantage that its access speed is slow compared with a conventional magnetical disk apparatus, and the improvement of this access speed has been a subject of research in recent years.

The structure of an optical disk will be described with reference to FIG. 7.

Tracks 22 are formed in a concentric or spiral manner on the disk surface of an optical disk 21. The FIG. 7(a) illustrates the case of concentric tracks 22. These tracks 22 are, as illustrated in detail in FIG. 7(b), long continuous physical protuberant portions which cross sections are trapezoidal (hereinafter referred to simply as protuberant portions), previously formed on the disk surface. Or these tracks 22 may be, as illustrated in detail in FIG. 7(c), long continuous phYsical variations previously formed on the disk surface by modifying the composition of the materials in specified sections of the recording surface, by making these sections only in a crystallized phase and the other sections in an amorphous phase, or the like. The write once type or rewritable type optical disk 21 is arranged so that the information from a user is recorded on the tracks 22 or in the intervals between the tracks 22. Moreover, ID sections 23, wherein information such as the track number, a synchronizing signal is previously recorded, are in some instances formed at a proper location on each of these tracks 22, by interrupting intermittently the protuberant portions of the disk surface as shown in FIG. 7(b), or by modifying intermittently physical property such as the variation of the reflectance ratio or the phase transition, as shown in FIG. 7 (c).

When the optical disk 21 is loaded in the recording-/reproducing apparatus, a light beam 24 from an optical head, not shown, is irradiated on the disk surface, as shown in FIG. 7(b). The light beam 24, beside executing the recording and the reproduction of the user's information, is also responsible for reading the information recorded in the above-mentioned ID sections 23 and for obtaining a tracking error information, through the variation in the amount of light of a reflected light from a track 22. When the random access of the user's information is carried out, the optical head is moved and slides in the radial direction of the optical disk 21, and the light beam 24 is controlled so that it is irradiated on a prescribed track 22, or on a prescribed interval between two tracks 22.

Hence, in order to access the optical disk rapidly, as mentioned earlier, a track counter for counting the number of tracks 22 the light beam 24 passes upon, and for detecting that the light beam 24 reached the prescribed track 22 when the optical head moves and slides, becomes indispensable.

The operation of a conventional track counter will be described with reference to FIG. 8.

In the optical head, a RES signal indicating the tracking error and a REF signal indicating the increase or reduction (variation) in the amount of reflected light, may be obtained from the reflected light of the light beam 24. The RES signal is a signal which detected that the light beam 24 deviated from a track 22 or from the center of an interval between two tracks 22 through the widely known 3-beam method or push-pull method, and is used in the tracking servo.

The REF signal is a signal which detected the variation in the amount of light of the reflected light from an optical disk 21, and is used for reading the information recorded in the above-mentioned ID sections 23 and the like.

As shown in FIG. 8, when the light beam 24 passes consecutively upon the tracks 22 as the optical head moves and slides, the RES signal shows a substantially sinusoidal waveform which equilibrium state is the zero level. As for the REF signal, it shows a substantially sinusoidal waveform which equilibrium state is the reference voltage Vr. The RES signal and the REF signal have a phase difference of almost $\pm 90°$ according to the passage direction of the light beam 24. Moreover, as in reality the optical disk 21 is rotating, the light beam 24 passes upon the tracks 22 not at right angles, but in the diagonal direction with respect to the longitudinal direction of the tracks 22.

Among the points where the level of the RES signal equals zero (hereinafter referred to as zero cross points), the zero cross points where the RES signal passes from a positive to a negative direction, indicate that the light beam 24 is positioned on the center of an interval between two tracks 22, as it is clearly illustrated the figure. Hence, if a ZC signal in which a pulse rises at each of these zero cross points, is generated, it becomes possible to detect the number of tracks 22 the light beam 24 passes upon by counting the pulses of the ZC signal.

Also, by checking whether the REF signal is higher or lower than the reference voltage Vr at a zero cross point where the above-mentioned RES signal passes from a negative to a positive direction, there may be detected whether the phase difference of both signals is positive or negative. For example, by generating a DIR signal which is in the high level when the REF signal is higher than the reference voltage Vr and in the low level when the REF signal is lower than the reference voltage Vr, the passage direction of the light beam 24 may be detected based on the DIR signal.

Thereby, up to now, for example the count up or down of an updown counter used to be determined according to the DIR signal, and the number of tracks 22 the light beam 24 passed upon used to be detected by counting the pulses of the ZC signal with this updown counter.

However, in some instances, ID sections 23 are formed on specific positions as mentioned earlier, on each track 22 of the optical disk 21 When the light beam 24 moves along a track 22, at these ID sections 23, as shown in FIG. 9, the interference action of the reflected lights varies because of the interruption in the protuberant portion and the REF signal has pulsations centered on the reference voltage Vr. Thereby, the track number information and the like, recorded in the ID sections 23 as outlined earlier, may be read by detecting whether this REF signal is higher or lower than the reference voltage Vr.

However, when such ID sections 23 are formed on each track 22, as shown in Fig. 10, when the optical head moves and slides and the light beam 24 crosses the ID sections 23, turbulence is generated in the RES signal and the REF signal. That is, the zero cross points of the RES signal become ambiguous, since the tracking error cannot be detected in the interrupted sections of the protuberant portions of the tracks 22, as shown in the figure. The waveform of the REF signal is also disturbed on a large scale for the similar reason. However, as the turbulence of the waveform of this REF signal is further complicated, it is omitted in the figure.

Therefore, an accurate number of tracks 22 the light beam 24 passed upon cannot be detected when the light beam 24 crosses the ID sections 23, by merely determining the count up or down based on the DIR signal and by counting the pulses of the ZC signal, like in a conventional track counter. Moreover, such a thing does not happen only when ID sections 23 are formed on the tracks 22, but also when a turbulence is generated in the waveforms of the RES signal and the REF signal because of a scratch on the optical disk 21 or the like.

Accordingly, the conventional track counter for optical disk used to present the problem that the improvement of the information access speed was hindered, because the light beam, controlled based on the number of tracks it passed upon, could not be moved quickly to a desired track.

SUMMARY OF THE INVENTION

The object of the present invention is to access rapidly a desired track by counting accurately the number of tracks a light beam passed upon.

In order to achieve the above-mentioned object, the track counter for optical disk in accordance with the present invention, that counts the number of tracks the light beam passes upon when an optical head moves on an optical disk in the radial direction, is characterized in comprising:

passage signal generating means for detecting that the light beam passed upon a track based on a reflected light of the light beam from the optical disk, and for releasing a passage signal on that occasion, a counter which counts the passage signals the passage signal generating means releases, count suspending means for forecasting that the light beam will pass upon a specific position of a track, and for suspending the count of the passage signals by the counter during this forecasted period, and count value compensating means for assuming, in the case the count suspending means suspended the count of the passage signals, the number of tracks the light beam passed upon during that period, and for adding this assumed number to the count value of the counter.

According to the above-mentioned arrangement, when the random access of the optical disk is carried out, the optical head moves and slides up to an assigned track on the optical disk. When the optical head moves in such a manner in the radial direction, the passage signal generating means detects that the light beam passed upon a track and releases a passage signal on that occasion. In order to detect that the light beam passed upon a track, the variation of the tracking error signal used for the tracking control for example, should be detected based on the reflected light of the light beam from the optical disk. Also, information indicating the passage direction of the light beam when it passes upon a track, may be included in this passage signal.

When the passage signal generating means releases a passage signal, the counter counts the passage signal. For example, when the optical head moves toward the outer periphery, supposing the count has been started from the innermost track, the count value of the counter indicates the number, from the inner side, of the track the light beam is actually irradiating. When the counter is either an up-counter or a down-counter, in order to move the optical head in the reverse direction, the optical head needs to be put back once to the position of the track which serves as reference, and the counter needs to be reset. However, in the case of an updown counter, by including in the passage signal the passage direction information mentioned earlier and by choosing the count up or down according to the passage direction, the number of tracks the light beam passed upon may be counted even when the optical head is moved in the reverse direction. Also, supposing that this counter is capable of counting in both positive and negative directions, the reference track maY be set not only on the extremity of the inner or outer periphery, but on any position.

At the time of the ordinary reproduction or recording, when the optical head passed upon a track while accessing successively consecutive sectors or the like, the modification of the actual position of the light beam according to this move needs to be managed through the use of this counter or other means.

When the optical head moves in the radial direction, the count suspending means forecasts that the light beam will pass upon a specific position of a track. The specific position of a track is the portion, where detecting the passage of the light beam accurately through the passage generating means, is difficult. That is, a position the recording/reproducing apparatus has detected and recorded, for example an ID section previously recorded for identifying each track on a specific position of the track, a scratch on the optical disk surface, or the like. However, all of these positions do not need to be forecasted as specific positions. It is left to the designer's choice to determine which will be designated as specific position.

For example, it is now supposed that the ID sections of an optical disk rotating at a constant angular velocity (CAV), are designated as specific positions. By reading the information of these ID sections during the ordinary reproduction or the like, and thereby usually recognizing through a timer, a PLL (phase locked loop) or the like, the positions of the above-mentioned ID sections on the optical disk, the passage by the light beam on one of the specific positions may be easily forecasted.

However, in the case ID sections are designated as specific positions when the rotation control of the optical disk is effectuated in constant linear velocity (CLV), or in the case scratches located at different positions on every disk are designated as specific positions, in addition to the positions of the above-mentioned ID sections on the optical disk, information or the like for identifying the track the light beam is actually irradiating becomes necessary.

When forecasting a specific position in the manner described above, the count suspending means suspends the count of the passage signals by the counter for the forecasted period. This may be effectuated by suspending the count of the counter despite the input of passage signals, or by suspending the release of passage signals by the passage signal generating means. By suspending the count through the count suspending means, the counter may be prevented of effectuating an inaccurate count, each time the light beam passes upon a specific position of a track.

However, while the count is suspended in such a manner at specific positions by the count suspending means, in reality the light beam does pass upon some tracks. Hence, when the count suspending means suspended the count of the passage signals, the count value compensating means first assumes the number of tracks the light beam passed upon during that period. The number of tracks the light beam passes upon (hereinafter referred to as number of passages) during the suspension of the count, may be easily assumed when the number of passages per time unit is maintained constant by the recording/reproducing apparatus, by multiplying this number by the period of time the count was suspended. It can also be assumed according to the passage speed before and after the passage on the specific positions. For example, after the count suspension is ended, by counting the passage signals through a second counter, other than the counter mentioned above, for a period equal to the suspension period, the result of the count by the second counter becomes the assumed number of passages.

After assuming in such manner the number of passages during the period of the count suspension, the count value compensating means further adds this assumed number to the count value of the above-mentioned counter. When the second counter mentioned above is used, the count values of the two counters should be added in adding means. In instances where the count values of the two counters are negative, the adding means performs the algebraic sum of these above-mentioned values. That is, the adding means is arranged so as to be capable of dealing with positive and negative values.

When the second counter is not used, the assumption and the addition of the number of passages may be effectuated at the same time, by doubling the count of the original counter for a period equal to the suspension period, after the count suspension is ended.

Furthermore, during the period the passage on specific position is forecasted, by suspending the generation of the original passage signals, and by sending to the counter, pseudo passage signals synchronized with the passage signals released up to that moment, the assumption and the addition of the number of passages may be effectuated at the same time.

Consequently, according to the track counter in accordance with the present invention, the number of tracks the light beam passed upon may be counted accurately even when the light beam passed upon an ID section or when the passage on a track cannot be detected because of a scratch on the disk surface or the like. Accordingly, the optical head is capable of moving quickly to the desired track, without moving insufficiently or excessively, and the access may be effectuated immediately.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram illustrating the composition of a track counter in accordance with the present invention.

FIG. 2 is a diagonal view illustrating the composition of a magneto-optical disk.

FIG. 3 is a time chart illustrating the waveforms of signals of the track counter shown in FIG. 1.

FIG. 4 is a block diagram illustrating the composition of another track counter in accordance with the present invention.

FIG. 5 is a time chart illustrating the waveforms of signals of the track counter shown in FIG. 4.

FIG. 6 is a block diagram illustrating the composition of the counter shown in FIG. 4.

FIG. 7 to FIG. 10 are views illustrating conventional examples.

FIG. 7(a) is a general diagonal view illustrating the composition of an optical disk.

FIGS. 7(b) and 7(c) are partial diagonal cross-sectional views illustrating the composition of optical disks.

FIG. 8 is a time chart illustrating the operation of a conventional track counter.

FIG. 9 is a diagonal view illustrating the composition of ID sections.

FIG. 10 is a plan view illustrating the problem arising each time a light beam passes upon ID sections.

DESCRIPTION OF THE EMBODIMENTS

Figure 1:
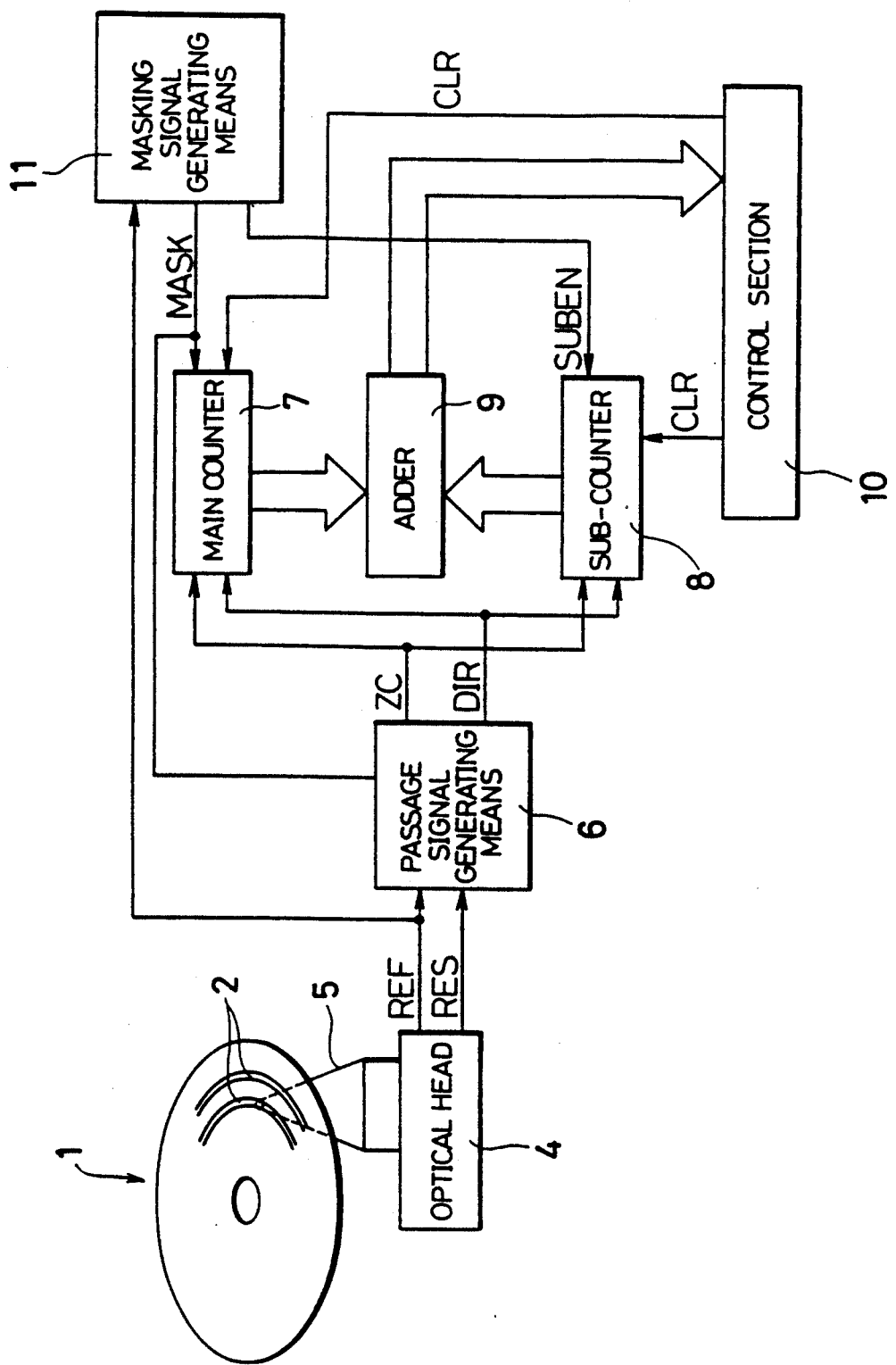
FIG. 1 to FIG. 3 show an embodiment of the present invention.
Figure 2:
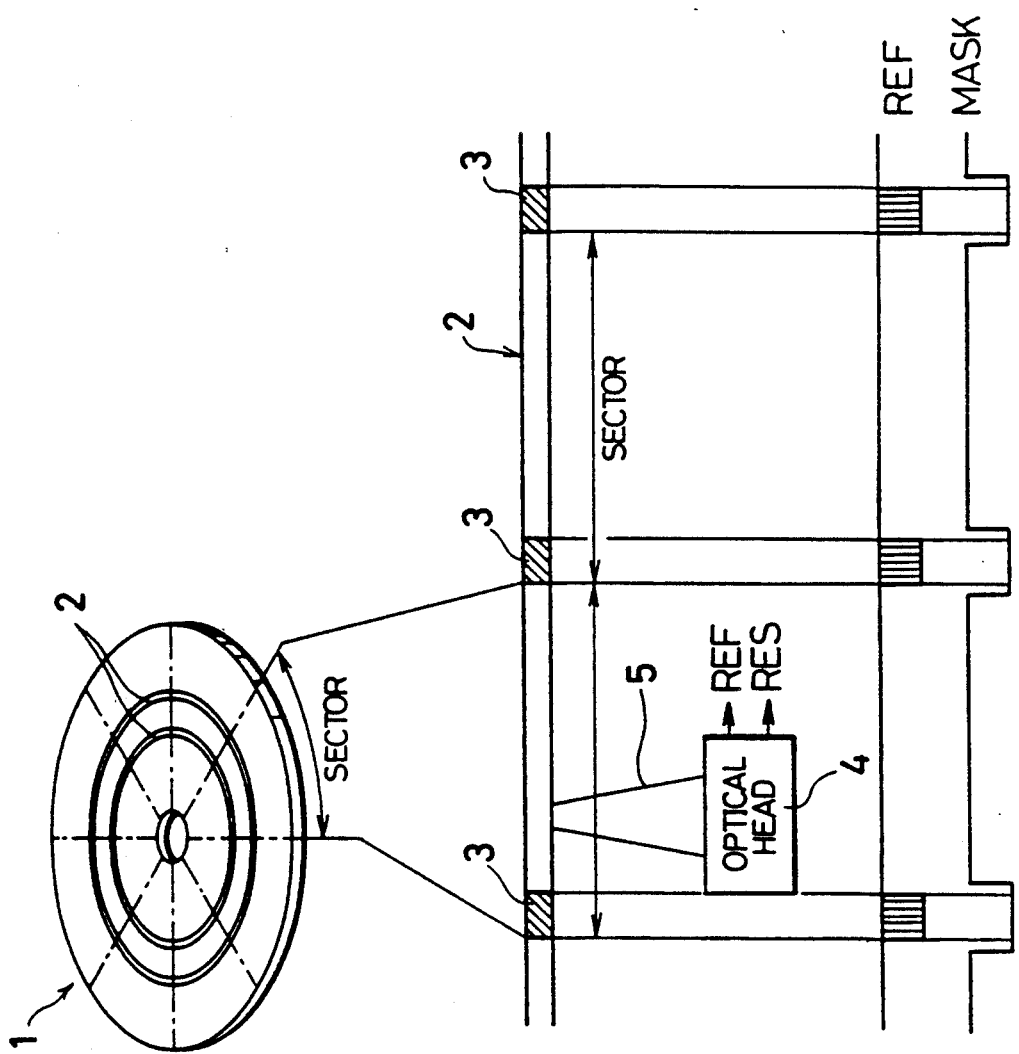
Figure 3:
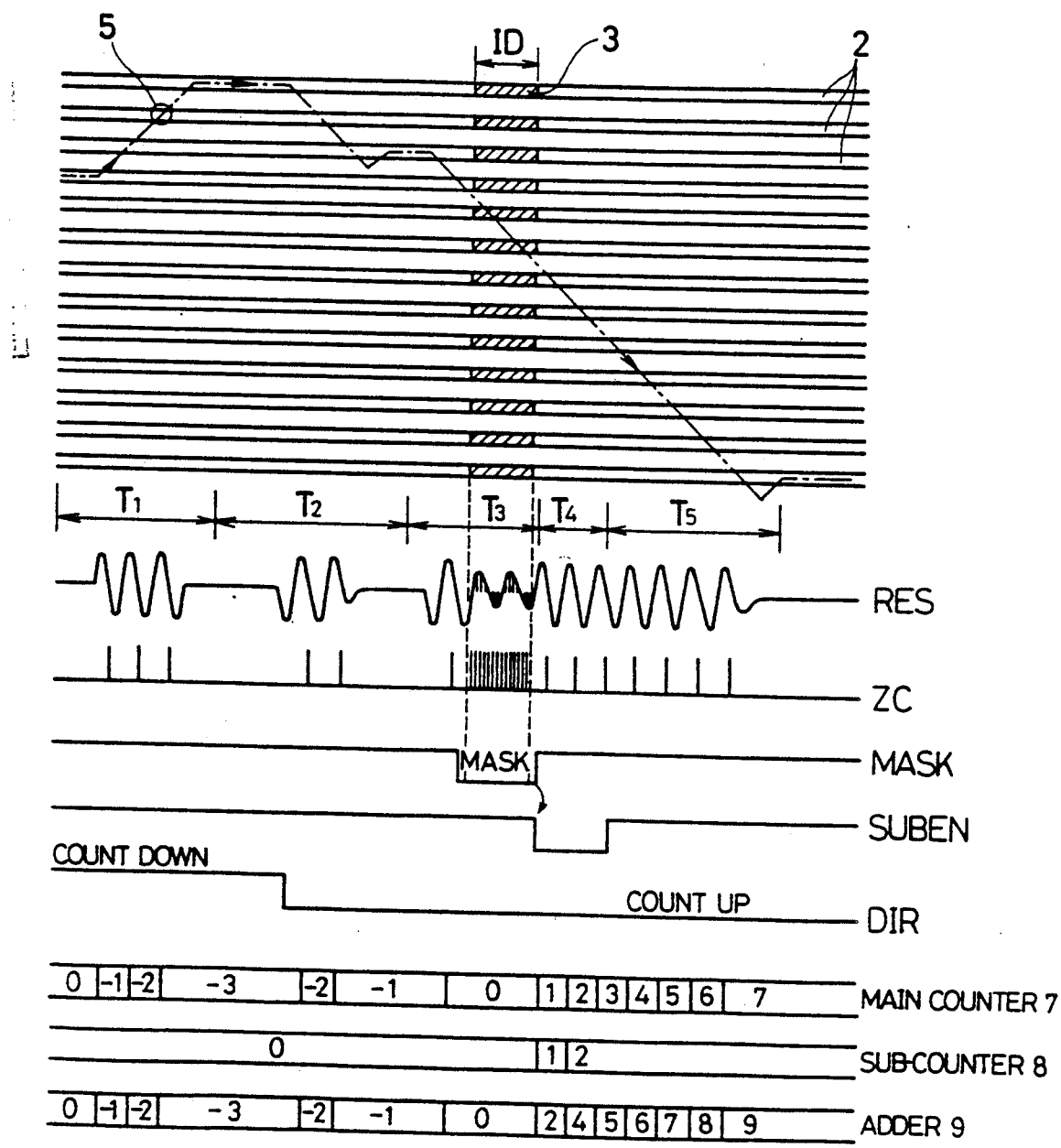

The following description will discuss an embodiment of the present invention with reference to FIG. 1 to FIG. 3.

A magneto-optical disk 1 used in the present invention is shown in FIG. 2.

On the disk surface of the magneto-optical disk 1 are formed a plurality of concentric tracks 2. The tracks 2 are long continuous physical protuberant portions which cross sections are trapezoidal (hereinafter referred to simply as protuberant portions), or physical variations (for example variation of the reflectance ratio, change of phase or the like) formed beforehand. In the present embodiment, the information of an user is recorded on one of the tracks 2. That is, each track 2 is divided and managed in a plurality of sectors sorted in classified intervals. The above-mentioned user's information, is recorded in a desired sector on a track 2. ID sections 3 for identifying the track number or the sector number, are formed at the forefront portion of each sector of a track 2. In the ID sections 3 are also recorded synchronizing signals for obtaining the timing which will serve as reference when recording and reproducing information.

The magneto-optical disk 1 is loaded on a magneto-optical disk recording/reproducing apparatus and is driven to rotate in constant angular velocity (CAV). The recording and the reproduction of information is effectuated through the irradiation of a light beam 5 by an optical head 4 on a track 2 of the magneto-optical disk 1. Based on a reflected light of the light beam 5 irradiated on a track 2, the optical head 4 generates a REF signal indicating the increase or reduction in the amount of this reflected light, and a RES signal for detecting the tracking error varying in accordance with the deviation of the light beam 5 from a track 2.

A track counter which counts the number of tracks 2 the light beam 5 passes upon, based on the REF signal and the RES signal generated by the aforementioned optical head 4, is shown in FIG. 1.

Provision is made so that the REF signal and RES signal released by the optical head 4, are respectively fed into passage signal generating means 6. Based on the RES signal and the REF signal, the passage signal generating means 6 generates a ZC signal indicating that the RES signal crossed a zero position from a positive to a negative direction, and a DIR signal indicating the passage direction of the light beam 5.

The ZC signal and DIR signal generated in the passage signal generating means 6, are respectively sent to a main counter 7 and a sub-counter 8. The counters 7 and 8 are updown counters capable of counting the number of tracks the light beam 5 passed upon, when the optical head 4 moves in either positive or negative direction with respect to the radial direction, and count up or down the pulses of the ZC signal based on the DIR signal. For example, they count down when the DIR signal is in the high level and count up when the DIR signal is in the low level.

The count outputs of the track counters 7 and 8 are sent respectively to an adder 9. The adder 9 is a circuit which adds algebraically the count values of the main counter 7 and the sub-counter 8, including positive and negative values.

The result of the addition performed in the adder 9 is sent to a control section 10. The control section 10 is composed of, for example a micro computer, and controls the sliding motion of the optical head 4 based on the result of the addition of the adder 9. The control section 10 is also arranged so .as to release a CLR signal for clearing the respective count values of the main counter 7 and the sub-counter 8 mentioned earlier, when necessary. Moreover, the control section 10 also executes the control of other devices of the magneto-optical disk recording/reproducing apparatus (not shown).

The REF signal, mentioned earlier, released from the optical head 4 is also sent to masking signal generating means 11.

The masking signal generating means detects the rotation phase of the magneto-optical disk 1 by reading the information of the ID sections 3 of the tracks 2 based on the REF signal, during the ordinary recording or reproduction. When the optical 4 head moves and slides, the masking signal generating means 11 forecasts that the light beam 5 will pass upon ID sections 3 through a timer or a PLL, based on the rotation phase detected up to that moment. The masking signal generating means 11 is arranged so as to release a MASK signal when it forecasts in such a manner that the light beam 5 will pass upon ID sections 3. The MASK signal is a signal which covers completely with its low level part, the portion in the REF signal read by the optical head 4, corresponding to the ID sections 3. However, this MASK signal is released only when the optical head 4 moves as described earlier.

The MASK signal released by the masking signal generating means is sent to the passage signal generating means 6 mentioned earlier and to the main counter 7 respectively. The passage signal generating means 6 is arranged such that, for example when the MASK signal changes to the low level, the state the DIR signal was up to that moment is kept, without regard to the state of the REF signal or the RES signal during that period. Also, the main counter 7 is arranged such that, when the MASK signal changes to the low level, the count of the pulses of the ZC signal is suspended during that period.

In the masking signal generating means 11, when the MASK signal returns to the high level, a SUBEN signal is released simultaneously. The SUBEN signal changes to the low level simultaneously with the return of the MASK signal to the high level, and stays in the low level for a period virtually equal to the period the MASK signal stayed in the low level. This SUBEN signal is sent to the sub-counter 8 mentioned earlier. The sub-counter 8 is arranged such as to count the pulses of the ZC signal in response to the DIR signal, while the SUBEN signal is in the low level.

An operation of a track counter arranged in the above-manner will be described with reference to FIG. 3. The FIG. 3 illustrates a typical operation of the light beam 5 on the tracks 2, and the variation of the waveforms of each signal at that time.

There is shown that the light beam 5 crossed three tracks upward in the figure during the period $T_1$. At that time, the RES signal from the optical head 4 shows a great amplitude of tracking error for 3 cycles. A ZC signal of a 3-pulse shape is released by the passage signal generating means 6, in accordance with the points where the RES signal crosses a zero position from a positive to a negative direction. Each pulse of the ZC signal indicates that the light beam 5 passed upon the center of an interval between two tracks 2.

At this time, as the DIR signal from the passage signal generating means 6 is in the high level, the counters 7 and 8 count down. Also, since the MASK signal and the SUBEN signal from the masking signal generating means 11 both stay in the high level, only the main counter 7 executes the count of the pulses of the ZC signal. For example it is now supposed that the count value of the main counter 7 was "0" at the beginning of the period $T_1$, the count value will be counted down by 3 counts to "−3", and the result of the count will be released as it is from the adder 9.

Then, during the period $T_2$, there is shown that the lilght beam 5 moved from two tracks downwards in the figure. Accordingly, a ZC signal of 2 pulses is released from the passage signal generating means 6. At this time, since the DIR signal changes to the low level, the count value of the main counter 7 is counted up by 2 counts from "−3" mentioned earlier to "−1". Thereby, the adder 9 releases this "−1", as it is.

During the periods $T_3$ to $T_5$, there is shown that the light beam 5 moved further from ten tracks downwards in the figure. However, in the latter half of the period $T_3$, the light beam 5 passes upon ID sections 3 of the tracks 2. Thereby, the RES signal shows a waveform similar to the earlier one in other parts, but turbulence (variation) occurs during the passage upon the ID sections 3. As illustrated in the central part of the figure, the ZC signal, during the period the light beam 5 passes upon the ID sections 3, releases a signal which is affected by the variation in the above-mentioned RES signal. Thereby, the ZC signal is completely unreliable during the passage of the light beam 5 upon the ID sections 3. As to the REF signal, it is not shown in order to avoid any complication, since its waveform in the corresponding part is further complex.

On the other hand in the masking signal generating means 11, the passage of the light beam 5 upon ID sections 3 is forecasted beforehand, and a MASK signal in the low level for a sufficient period, including before and after the passage, is released. Accordingly, the main counter 7 suspends the count of the pulses of the ZC signal while the MASK signal is in the low level, and count the pulses of the ZC signal before and after. In the passage signal generating means 6, the variation of the DIR signal is prohibited for the period the MASK signal is in the low level, so that the detection of the passage direction might be effectuated accurately when the MASK signal returns to the high level. In reality, when the light beam 5 passes upon the ID sections 3, it crosses two tracks 2. Thus, the count of two tracks 2 is missing in the result of the count of the counter 7.

The masking signal generating means 11 is arranged such that, as soon as the MASK signal returns to the high level at the end of the period $T_3$, the SUBEN signal goes and stays in the low level for virtually the same period as the MASK signal. Thus, the sub-counter 8 counts the pulses of the ZC signal in parallel with the main counter 7, during the period the SUBEN signal stays in the low level (in this case, two counts are effectuated). Namely, the output (count value) of the sub-counter 8 which counted the pulses of the ZC signal, corresponds to the assumed number of tracks the light beam 5 passed upon when it was passing upon the ID sections 3. The count value of the sub-counter 8 is added successivelY to the count value of the main counter 7 in the adder 9. Thereby, in the period $T_5$, the number of tracks the light beam 5 passed upon may be obtained accurately from the output of the adder 9. Thus, the control section 10 becomes able to perform accurately the control of the sliding motion of the optical head 4 based on the correct number.

Another embodiment of the present invention will be described with reference to FIG. 4 to FIG. 6. For reasons of convenience in the description, the composing members having the same functions than in the embodiment shown in FIG. 1 mentioned earlier, will be designated by the same code and their detailed description will be omitted.

The magneto-optical disk used in the present embodiment is the same as the one used in the first embodiment described earlier; each track 2 is divided into sector units and ID sections 3 are formed at the head portion of each of the sectors. The magneto-optical disk 1 is loaded in a magneto-optical disk recording/reproducing apparatus, and is driven to rotate at a constant angular velocity. The optical head 4 irradiates the light beam 5 on the tracks 2 of this rotating magneto-optical disk 1, and generates a REF signal and a RES signal based on the reflected light thereof.

Figure 4:
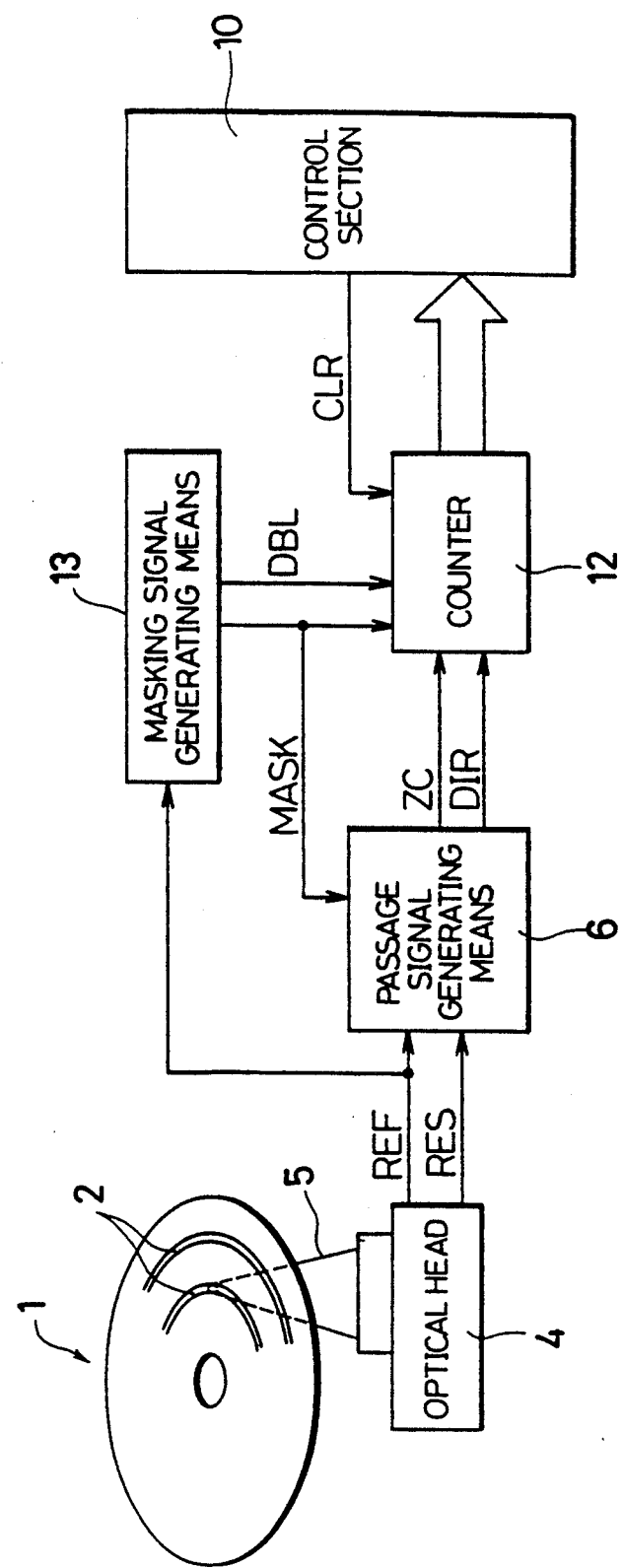
FIG. 4 to FIG. 6 show another embodiment of the present invention.
Figure 5:
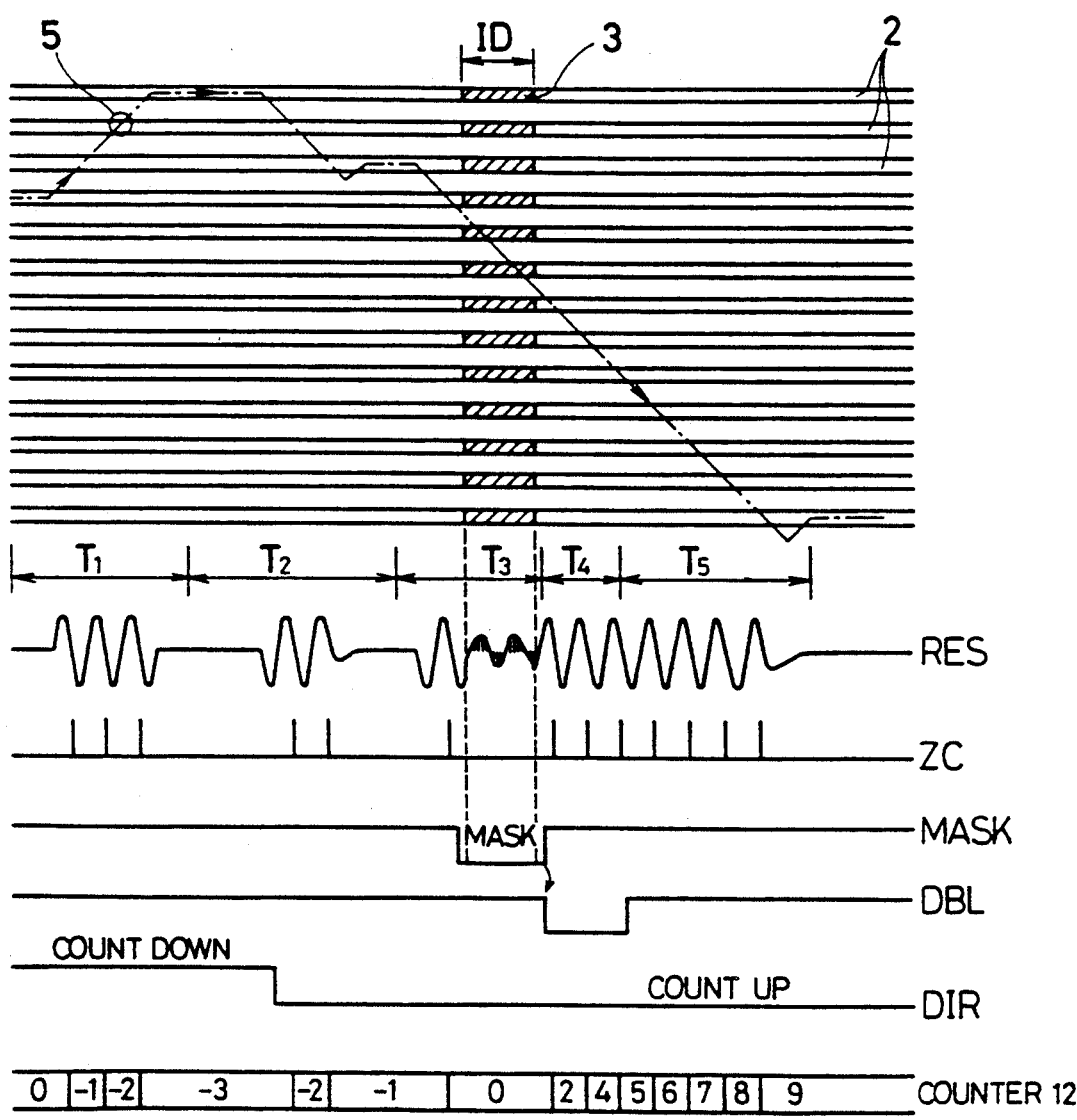

A track counter that counts the number of tracks 2 the light beam 5 passed upon based on the REF signal and the RES signal generated by the above-mentioned optical head 4, is illustrated in FIG. 4.

Provision is made such that the REF signal and the RES signal released by the optical head 4, are sent respectively to the passage signal generating means 6. Also, a ZC signal and a DIR signal generated by this passage signal generating means 6 are sent to a counter 12.

The counter 12, like the main counter 7 of the embodiment outlined above, is an updown counter capable of counting the pulses of the ZC signal in either positive or negative direction with respect to the radial direction. For example, it counts down when the DIR signal is in the high level, and counts up when the DIR signal is in the low level. The counter 12 will be described in more details later.

The count value of the counter 12 is sent to the control section 10. The control section 10 is arranged such as to supply a CLR signal to the Counter 12 when necessary.

The REF signal from the above-mentioned optical head 4 is also sent to masking signal generating means 13. The masking signal generating means 13 is arranged so as to release a MASK signal based on the REF signal when the optical head 4 slides. The MASK signal is sent to the above-mentioned passage signal generating means 6 as well as to the counter 12, and executes the prohibition of variation in the DIR signal, and the suspension of the count of the pulses of the ZC signal.

However, unlike in the example mentioned above, when the MASK signal returns to the high level, the masking signal generating means 13 does not release a SUBEN signal, but a DBL signal. The DBL signal changes to the low level simultaneously with the return of the MASK signal to the high level, and stays in the low level for a period substantially equal to the period the MASK signal was in the low level. The DBL signal is practically identical to the SUBEN signal. Provision is made so that the DBL signal is sent together with the MASK signal to the counter 12 mentioned earlier.

Figure 6:
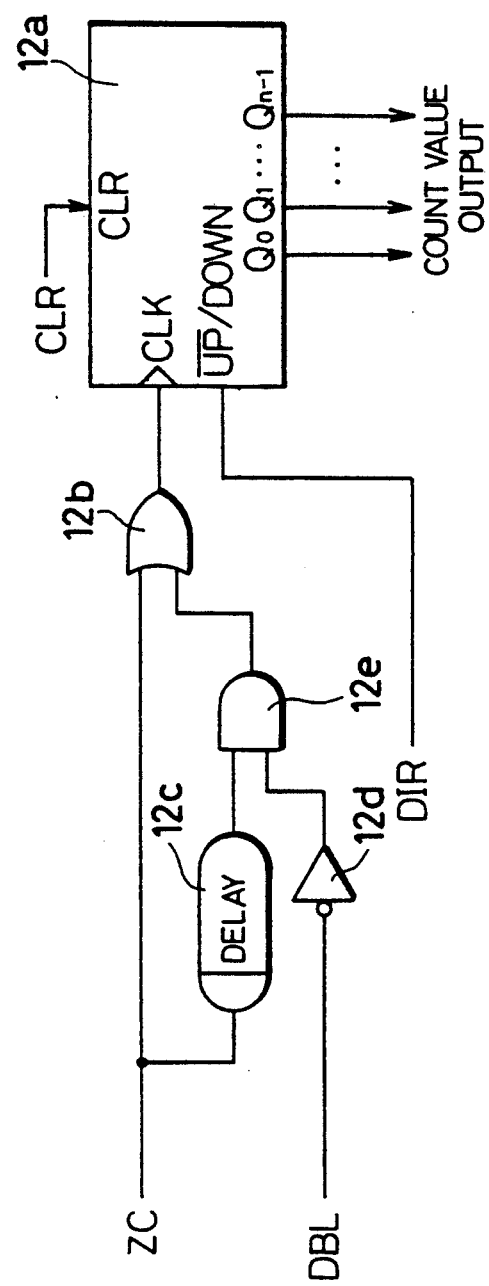
Figure 8:
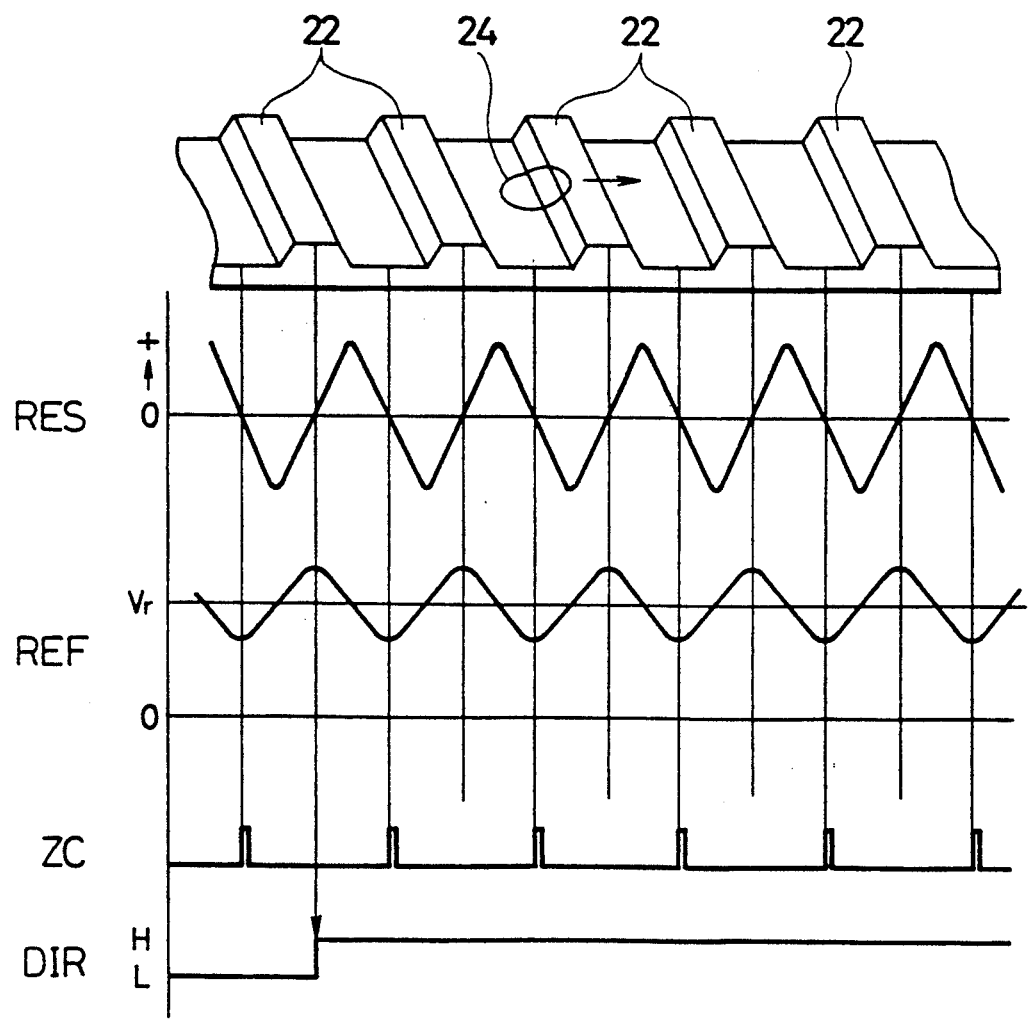
Figure 9:
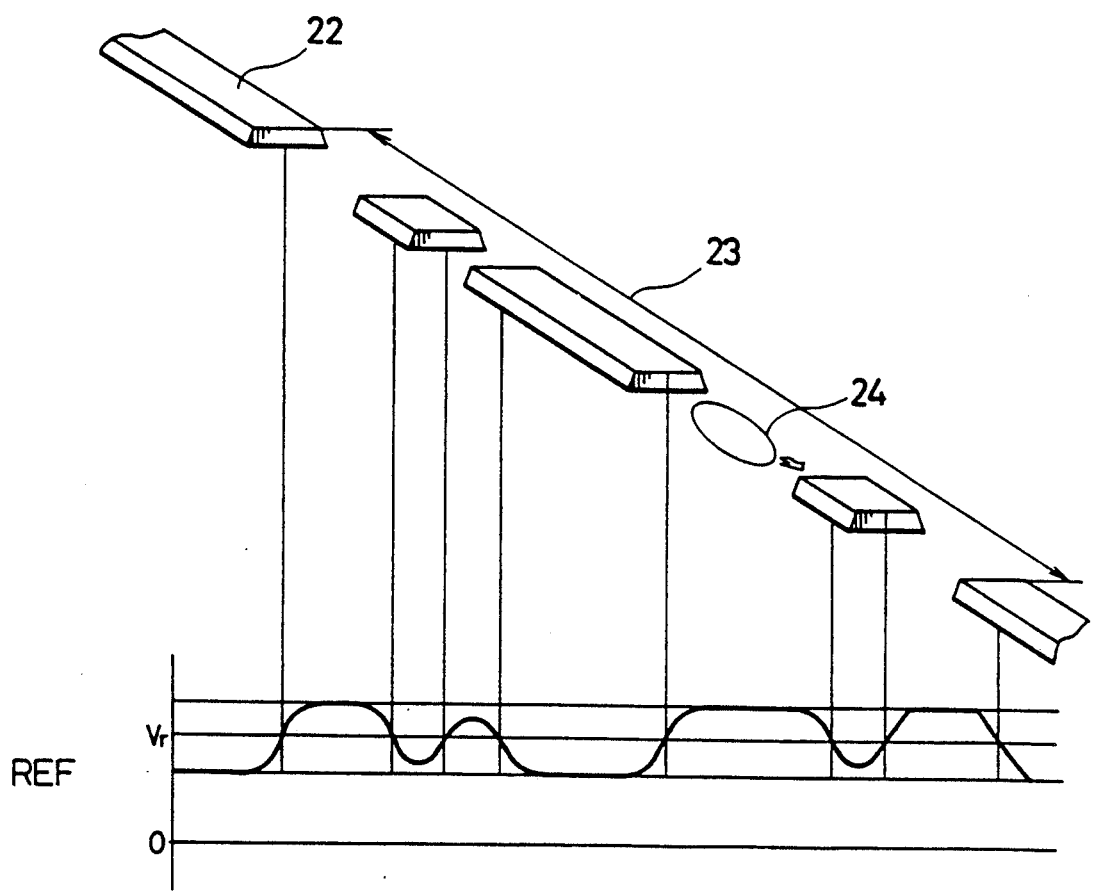
Figure 10:
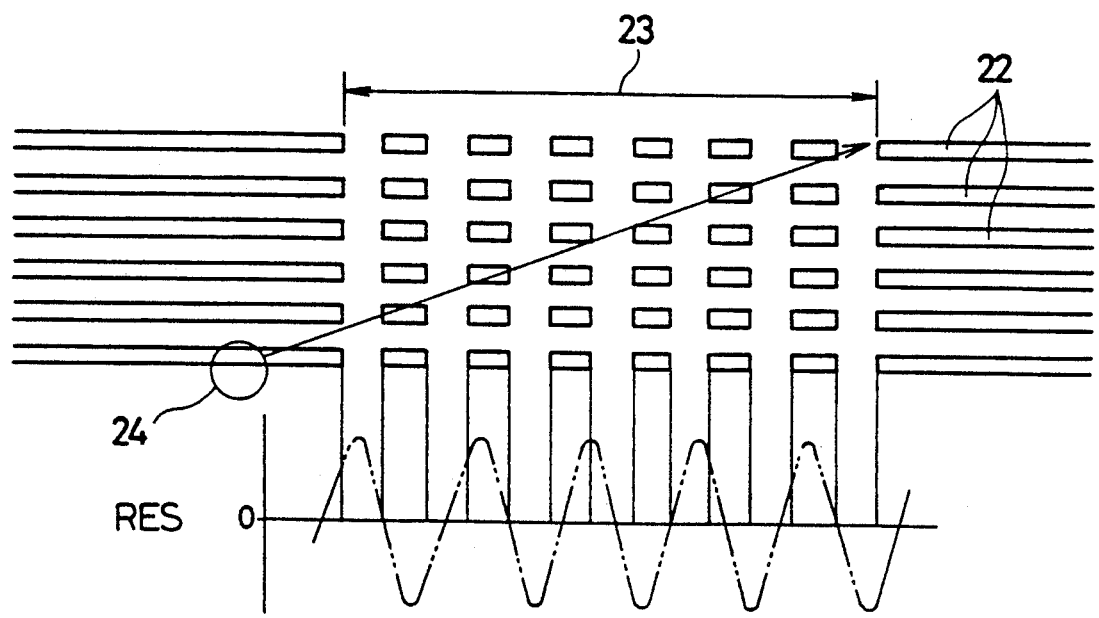

The counter 12 is arranged such as to send the above-mentioned ZC signal and DBL signal to a clock input CLK of an updown counter 12a through a circuit illustrated in FIG. 6. Namely, the ZC signal is sent to an input of an OR circuit 12b and to the input of a delay line 12c. The DBL signal is sent to an input of an AND circuit 12e through an inverter circuit 12d. The other input of the AND circuit 12e is connected with the output of the delay line 12c. The output of the AND circuit 12e is connected to the other input of the OR circuit 12b mentioned earlier. And the output of the OR circuit 12b is connected to the clock input CLK of the updown counter 12a.

According to the arrangement of the circuit described above, while the DBL signal is in the high level, the ZC signal is entered in the updown counter as it is. During the period wherein the DBL signal is in the low level, each time a pulse of the ZC signal is entered, a pulse which was delayed by the time St in the delay line 12c, is entered following the above-mentioned pulse. In other words, the updown counter 12a counts one pulse twice. Thus, the total number of pulses counted by the above-mentioned counter 12 while the DBL signal is in the low level, equals twice the number of pulses the ZC has in reality. Then, the count result of the updown counter 12a is sent to the control section 10 as the output of the updown counter 12a.

This counter 12 may be also arranged such as to double by itself the value counted during a fixed period of time independently of the DBL signal, after the MASK signal returned to the high level. In this case, the masking signal generating means 13 does not need to generate the DBL signal.

An operation of a track counter arranged in the manner outlined above, will be described with reference to FIG. 5. Like FIG. 3 mentioned earlier, FIG. 5 illustrates a typical operation of the light beam 5 upon the tracks 2, and the variation of the waveforms of each signal during this operation. It illustrates a case wherein the light beam 5 effectuates the same motion as in FIG. 3.

During the period $T_1$ and the period $T_2$, the counter 12 effectuates the same operation as the main counter 7 in the example outlined earlier, and the count value is counted down by 3 counts, from "0" to "−3", and counted up by 2 counts to "−1" thereafter.

During the period $T_3$, wherein the light beam 5 passes upon ID sections 3, the counter 12 effectuates the same operation as the main counter 7 in the example outlined above, since the count is suspended by the MASK signal of the masking signal generating means 13.

On the other hand, during the period $T_4$, after the light beam 5 completed the passage upon the ID sections, the DBL signal changes to the low level and the count of the counter 12 is doubled. Therefore, the counter 12 performs the count twice each time one pulse of the signal ZC is entered. Consequently, in the period $T_5$, the DBL signal returns to the high level and the counter 12 executes the usual count, that is the counter 12 counts one pulse as one count. Thus, the count result and the output of the adder 9 in the example outlined before, are identical. Namely, during the period $T_4$, the counter 12 added as real count value, the number of tracks the light beam 5 assumably passed upon while the count of the pulses of the ZC signal was suspended.

Accordingly, the control section 10 is able to obtain an accurate number of the tracks the light beam 5 passed upon, directly from the output of the counter 12. Thereby the control section 10 may execute accurately the control of the sliding motion of the optical head 4 based on the accurate number.

In the examples illustrated above, description has been made of track counters for magneto-optical disk, however a track counter composed similarly and provided with the same functions may be also employed in the case of an optical disk of for example the phase change type. There is no need to say that the present invention may be employed with any optical disk provided with tracks substantially continuous, ID sections or the like excepted. Also, the counter 7, counter 8 and counter 12 do not necessarily need to be updown counters, but they may be either down-counters or up-counters. In this case, the adder 9 described above may be an adder capable of effectuating only simple additions.

As described above, the track counter for optical disk in accordance with the present invention, forecasting that the light beam will pass upon a specific position of a track, comprises count suspending means and count value compensating means, and is arranged such that the above-mentioned count suspending means suspends the count by a counter of passage signals during the above-mentioned forecasted period. Provision is made so that the above-mentioned count value compensating means releases an assumed value of the number of tracks the light beam passed upon during the count suspension period of the counter, and that the counter adds this assumed value to the count value.

Accordingly, the count of the tracks the light beam passed upon may be effectuated accurately even when the light beam passed upon ID sections of a track, or when the passage on a track cannot be detected because of a scratch on the disk surface or the like. Thereby, the present invention, by being able to detect accurately through a track counter the number of tracks the light beam passed upon when the optical head moves and slides, is able to enhance the access speed.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A track counter for optical disk that counts the number of tracks a light beam passes upon when an optical head moves over an optical disk in the radial direction, comprising:

passage signal generating means for detecting based on a reflected light of said light beam from said optical disk that said light beam passed upon one of said tracks and for releasing a passage signal thereupon;

a counter that counts said passage signals released by said passage signal generating means;

count suspending means for forecasting that said light beam will pass upon a specific position on one of said tracks, and for suspending the count by said counter of said passage signals; and count value compensating means for assuming, in the case said count suspending means suspended the count of said passage signals, the number of tracks said light beam passed upon during that period, and for adding this assumed number to the count value of said counter.

2. The track counter for optical disk as defined in claim 1, wherein said passage signal generating means is arranged so as to release a ZC signal indicating that a RES signal, which represents the tracking error, passed through a zero position from a positive to a negative direction, and a DIR signal indicating the passage direction of said light beam with respect to said tracks, based on a REF signal which represents the variation in the light amount of the reflected light of said light beam from said optical head.

3. The track counter for optical disk as defined in claim 2, wherein said counter comprises a main counter capable of counting up and down, that counts the pulses of the ZC signal based on the DIR signal.

4. The track counter for optical disk as defined in claim 3, wherein said count value compensating means is composed of an adder and a sub-counter, and adds algebraically the count value of the aforementioned main counter and the count value of the sub-counter.

5. The track counter for optical disk as defined in claim 4 further comprising a control section composed of a microcomputer, that controls said optical head based on the addition result of the aforementioned adder, and that releases a clear signal which clears the count value of the aforementioned main counter and sub-counter.

6. The track counter for optical disk as defined from claim 1 to claim 4, wherein said count suspending means is arranged such as to release, in synchronization with the detection cycle of ID sections, a MASK signal for suspending the count by said counter of said passage signals only during the access by said optical head, and such that the output of this MASK signal is kept in an active state for a period longer than the period needed for the detection of these ID sections.

7. The track counter for optical disk as defined in claim 6, wherein the MASK signal is synchronized with the detection cycle of the ID sections by a timer circuit, a PLL circuit or other circuit, capable of sensing the positions where the ID sections are located.

8. The track counter for optical disk as defined in claim 6, wherein said passage signal generating means is arranged so as to keep the DIR signal unmodified while the MASK signal is released.

9. The track counter for optical disk as defined in claim 6, wherein the main counter is arranged so as to suspend the count of the pulses of the ZC signal while the MASK signal is released.

10. The track counter for optical disk as defined in claim 6, wherein said count suspending means is arranged so as to release, when the aforementioned MASK signal becomes inactive, a SUBEN signal which becomes active for a period substantially equalling the period the MASK signal was active.

11. The track counter for optical disk as defined in claim 10, wherein the sub-counter is arranged so as to count the pulses of the ZC signal based on the DIR signal during the period the SUBEN signal is active.

12. A track counter for optical disk that counts the number of tracks a light beam passes upon when an optical head moves over an optical disk in the radial direction, comprising:
passage signal generating means for detecting based on a reflected light of said light beam from said optical disk that said light beam passed upon one of said tracks and for releasing a passage signal thereupon;
a counter circuit that counts said passage signals released by said passage signal generating means;
count suspending means for forecasting that said light beam will pass upon a specific position on one of said tracks, and for releasing during this forecasted period, a MASK signal for suspending the count by said counter circuit of said passage signals, only while said optical head is accessing; and
a control section that determines the number of tracks said light beam passed upon based on the output of said counter circuit, and releases a clear signal for clearing the count value of said counter circuit,
and arranged such that, when said count suspending means suspends the count by said counter circuit of said passage signals, the count value of said counter circuit is doubled during a period substantially equalling the period said MASK signal was released.

13. The track counter for optical disk as defined in claim 12, wherein said passage signal generating means is arranged so as to release a ZC signal indicating that a RES signal, which represents the tracking error, passed through a zero position from a positive to a negative direction, and a DIR signal indicating the passage direction of said light beam with respect to said tracks, based on a REF signal which represents the variation in the light amount of the reflected light from said optical disk.

14. The track counter for optical disk as defined in claim 13, wherein said count suspending means is arranged such as to release a DBL signal which is active for a period substantially equalling the period said MASK signal was released, when said MASK signal passed from an active state to an inactive state.

15. The track counter for optical disk as defined in claim 14, wherein said counter circuit comprises:
a delaying element that delays the phase of the ZC signal by a prescribed time;
an inverter circuit that inverts the logic of the DBL signal;
an AND circuit that executes the logical multiplication of the output from the delaying element and the output from the inverter circuit;
an OR circuit that executes the logical sum of the ZC signal and the output of the AND circuit; and
a counter that counts up or down the output of the OR circuit, as a clock signal, based on said DIR signal, and clears the count value based on a clear signal from said control section.

16. The track counter for optical disk as defined in claim 12, wherein said count suspending means is arranged such as to release said MASK signal for suspending the count by said counter circuit of said passage signals, in synchronization with the detection cycle of ID sections, and such that output of said MASK signal is kept in an active state for a period longer than the period needed for the detection of these ID sections.

17. The track counter for optical disk as defined in claim 16, wherein the MASK signal is synchronized with the detection cycle of the ID sections by a timer circuit, a PLL circuit or other circuit, capable of sensing the positions where the ID sections are located.

18. The track counter for optical disk as defined in claim 16, wherein said passage signal generating means is arranged so as to keep the DIR signal unmodified while said MASK signal is released.

19. The track counter for optical disk as defined in claim 16, wherein said counter circuit is arranged so as to suspend the count of the pulses of the ZC signal while the MASK signal is released.

20. The track counter for optical disk as defined in claim 12, wherein said counter circuit is arranged such that the count value is automatically doubled for a period of time previously established, after the MASK signal returned to the inactive state.

* * * * *